Aug. 6, 1929.  W. A. STARCK  1,723,664

AUTOMOBILE SIDE BAR HEAD

Filed Oct. 15, 1927

INVENTOR
William A. Starck
BY Edwin B.H. Power, Jr.
ATTORNEY

Patented Aug. 6, 1929.

1,723,664

UNITED STATES PATENT OFFICE.

WILLIAM A. STARCK, OF MILWAUKEE, WISCONSIN, ASSIGNOR TO BADGER MANUFACTURING CORPORATION, OF MILWAUKEE, WISCONSIN, A CORPORATION OF WISCONSIN.

AUTOMOBILE SIDE-BAR HEAD.

Application filed October 15, 1927. Serial No. 226,426.

This invention relates to an automobile side bar head.

An object of the invention is to provide a side bar head to which a bumper bracket may be readily attached.

Another object is to provide a side bar head to which a bumper bracket may be attached and held against relative movement by a single bolt.

According to the invention, a bumper bracket is attached to the side bar head by a single fastener and held against movement relatively thereto by a shaped seat on the side bar head which engages a complementary face on the bracket.

Automobile side bar heads embodying the invention are shown in the accompanying drawing, in which the views are as follows.

Figure 1:
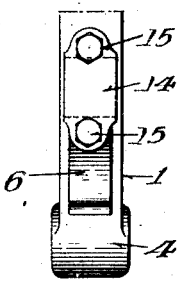
Fig. 1 is a front view of a side bar head having a bracket attached thereto.

Figs. 1 to 4.

The side bar head has a body 1, a shank 2 for attachment to the end of an automobile frame side bar 3, and an eye 4 for attachment to the end of an automobile spring.

A seat 5 is provided upon the upper surface of the body 1 to support a bumper bracket 6 and is curved or shaped longitudinally to prevent the bracket from turning thereon.

The body 1 has a bolt hole 7 formed therein which intersects the seat 5 intermediate to the ends thereof.

A boss 8 at the lower end of the hole 7 provides an abutment for the head of a bolt 9 which is arranged in the hole 7.

The bolt 9 has the upper end thereof threaded into a bolt hole 10 in the bracket 6 and secures the bracket on the seat 5.

The bracket 6 has a curved or shaped lower face 11 which is complementary to the seat 5 and coacts therewith to prevent the bracket from turning upon the bolt 9.

A bumper support 12 on the forward end of the bracket 6 is provided with a groove 13 to receive a bumper attaching bar which may be held therein by a clamping plate 14 and bolts 15.

Figure 5:
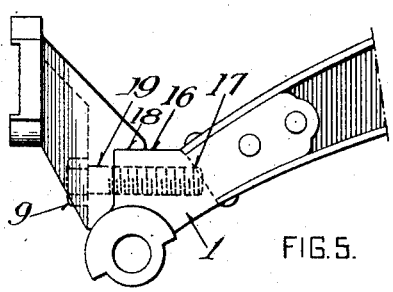
Fig. 5 is a side view of a head and bracket having angular engaging faces.
Figure 6:
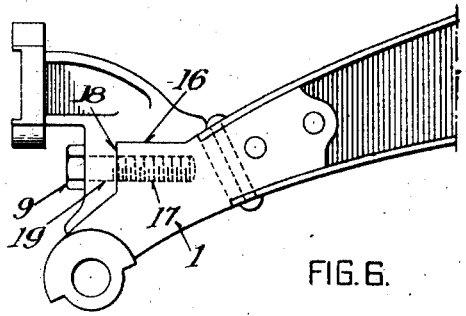
Fig. 6 is a side view of a modified form of the head and bracket shown in Fig. 5.
Figure 7:
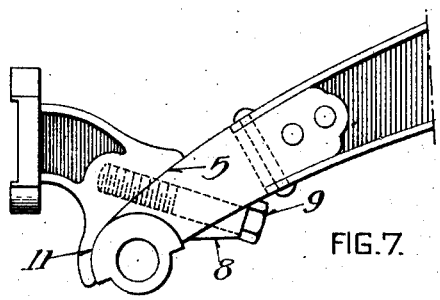
Fig. 7 is a side view of another modified form.

The seat 5 and the complementary face 11 may be shaped in various ways to prevent the bumper bracket from turning on the seat, as illustrated by the forms shown in Figs. 5, 6 and 7.

Figs. 5 and 6.

Each of these side bar heads has an angular seat 16 and a threaded bolt hole 17 which extends rearwardly from the vertical face of the seat 16.

Each bumper bracket has an angular recessed face 18 which is complementary to the seat 16 and coacts therewith to prevent the bracket from turning.

A bolt hole 19 is provided in each bracket in alignment with the bolt hole 17 to receive the bolt 9 which secures the bracket to the seat 16.

Fig. 7.

Figure 2:
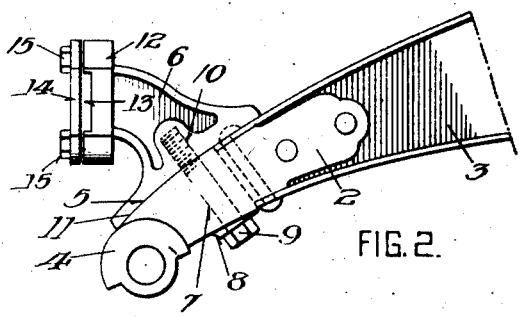
Fig. 2 is a side view thereof.
Figure 3:
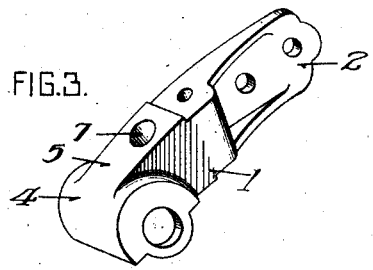
Fig. 3 is a perspective view of the side bar head shown in Figs. 1 and 2.
Figure 4:
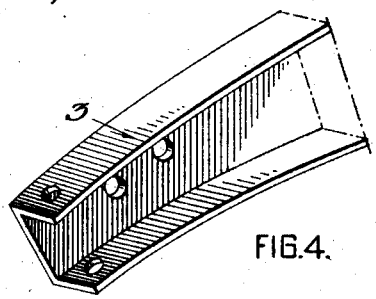
Fig. 4 is a perspective view of the end of a side bar to which the head is attached.

This embodiment is a modification of the form shown in Figs. 1 to 3 and differs therefrom only in that the bracket is arranged at the forward end of the side bar head, the seat 5 and the complementary face 11 have a greater curvature, and the bolt 9 extends diagonally through the side bar head.

The invention herein set forth is susceptible of various modifications without departing from the scope thereof as hereafter claimed.

The invention claimed is as follows:

1. An automobile side bar head having a single hole to receive a bolt to retain a bumper bracket in position thereon, and a seat shaped to engage the bumper bracket and retain the same from turning upon said bolt.

2. An automobile side bar head having a single hole to receive a bolt to retain a bumper bracket in position thereon, and an angular seat shaped to engage the bumper bracket and retain the same from turning upon said bolt.

3. An automobile side bar head, a bumper bracket, and a single bolt to retain said bracket upon said head, the head having a seat formed thereon and shaped to engage the complementary face of the bracket to prevent it turning upon said bolt.

4. An automobile side bar head, a bumper bracket, and a single bolt to retain said bracket upon said head, the head having an angular seat formed thereon and shaped to engage a complementary angular recess of the bracket to prevent it turning upon said bolt.

5. An automobile side bar head, and a bumper bracket having alined holes to receive a single bolt to retain said bracket upon said head, the head having a seat formed thereon and shaped to engage the complementary face of the bracket to prevent it turning upon said bolt.

6. An automobile side bar head, and a bumper bracket having alined holes to receive a single bolt to retain said bracket upon said head, the head having an angular seat formed thereon and shaped to engage a complementary angular recess of the bracket to prevent it turning upon said bolt.

7. An automobile side bar head having a seat thereon to co-act with a complementary face on a bumper bracket and prevent the same from turning on said seat, and means to retain said bracket on said seat.

In witness whereof, I have hereunto subscribed my name.

WILLIAM A. STARCK.

CERTIFICATE OF CORRECTION.

Patent No. 1,723,664. Granted August 6, 1929, to

WILLIAM A. STARCK.

It is hereby certified that the State of Incorporation of the assignee in the above numbered patent was erroneously given as "Wisconsin" whereas said State should have been given as "Delaware", as shown by the records of assignments in this office; and that the said Letters Patent should be read with this correction therein that the same may conform to the record of the case in the Patent Office.

Signed and sealed this 29th day of October, A. D. 1929.

(Seal)

M. J. Moore,
Acting Commissioner of Patents.